US010394789B1

(12) United States Patent
Animesh et al.

(10) Patent No.: US 10,394,789 B1
(45) Date of Patent: Aug. 27, 2019

(54) TECHNIQUES AND SYSTEMS FOR SCALABLE REQUEST HANDLING IN DATA PROCESSING SYSTEMS

(71) Applicant: Amazon Technologies, Inc., Seattle, WA (US)

(72) Inventors: Rishabh Animesh, Seattle, WA (US); Sandesh Doddameti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 14/961,749

(22) Filed: Dec. 7, 2015

(51) Int. Cl.
  *G06F 16/00* (2019.01)
  *G06F 16/22* (2019.01)
  *H04L 29/08* (2006.01)
  *G06F 16/27* (2019.01)

(52) U.S. Cl.
  CPC ...... *G06F 16/2282* (2019.01); *G06F 16/2228* (2019.01); *G06F 16/27* (2019.01); *G06F 16/278* (2019.01); *H04L 67/10* (2013.01)

(58) Field of Classification Search
  CPC ......... G06F 17/30345; G06F 17/30312; G06F 16/27
  USPC ....................................................... 707/769
  See application file for complete search history.

(56) References Cited

U.S. PATENT DOCUMENTS

| 5,276,848 | A | 1/1994 | Gallagher et al. |
|---|---|---|---|
| 5,729,671 | A | 3/1998 | Peterson et al. |
| 6,161,208 | A | 12/2000 | Dutton et al. |
| 6,249,836 | B1 | 6/2001 | Downs et al. |
| 6,513,099 | B1 | 1/2003 | Smith et al. |
| 6,779,150 | B1 | 8/2004 | Walton et al. |
| 6,862,362 | B2 | 3/2005 | Gangadhar |
| 6,922,700 | B1 | 7/2005 | Aggarwal et al. |
| 7,117,294 | B1 | 10/2006 | Mi et al. |
| 7,142,150 | B2 | 11/2006 | Thackray |
| 7,380,129 | B2 | 5/2008 | Keohane et al. |
| 7,490,013 | B2 | 2/2009 | Wells |
| 7,693,813 | B1 | 4/2010 | Cao et al. |
| 7,783,600 | B1 | 8/2010 | Spertus et al. |

(Continued)

FOREIGN PATENT DOCUMENTS

| JP | 2004531923 A | 10/2004 |
|---|---|---|
| KR | 20130107383 A | 10/2013 |

(Continued)

OTHER PUBLICATIONS

Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.

(Continued)

*Primary Examiner* — Thu Nguyet T Le
(74) *Attorney, Agent, or Firm* — Davis Wright Tremaine LLP

(57) ABSTRACT

A computer system, such as a data storage system, implements techniques for managing unpredictable and/or bursty system demand. For example, a database service implements a schema and/or a database table rotation that allows for events to be allocated substantially evenly across the available keyspace. In some embodiments, asynchronous and synchronous components of a data processing system are accordingly isolated so as to improve the operational efficiency and utilization of both.

19 Claims, 9 Drawing Sheets

(56) References Cited

U.S. PATENT DOCUMENTS

| | | | |
|---|---|---|---|
| 7,805,706 B1 | 9/2010 | Ly et al. |
| 7,930,611 B2 | 4/2011 | Huang et al. |
| 8,261,033 B1 | 9/2012 | Slik et al. |
| 8,370,579 B2 | 2/2013 | Strumpen |
| 8,386,841 B1 | 2/2013 | Renade |
| 8,413,187 B1 | 4/2013 | Del Sesto et al. |
| 8,479,078 B2 | 7/2013 | Resch et al. |
| 8,504,518 B1 | 8/2013 | Ghemawat et al. |
| 8,504,535 B1 | 8/2013 | He et al. |
| 8,566,525 B2 | 10/2013 | Ash et al. |
| 8,612,219 B2 | 12/2013 | Tsuchinaga et al. |
| 8,621,069 B1 | 12/2013 | Tompkins |
| 8,706,980 B2 | 4/2014 | Dhuse et al. |
| 8,769,049 B2 | 7/2014 | Murphy et al. |
| 8,788,855 B2 | 7/2014 | Cong et al. |
| 8,806,296 B1 | 8/2014 | Lazier |
| 8,850,288 B1 | 9/2014 | Lazier et al. |
| 8,868,825 B1 | 10/2014 | Hayes et al. |
| 8,869,001 B1 | 10/2014 | Lazier |
| 8,935,221 B1 | 1/2015 | Lazier et al. |
| 8,935,761 B2 | 1/2015 | Gladwin et al. |
| 8,938,591 B2 | 1/2015 | Mark et al. |
| 8,959,067 B1 | 2/2015 | Patiejunas et al. |
| 8,984,363 B1 | 3/2015 | Juels et al. |
| 8,984,384 B1 | 3/2015 | Juels et al. |
| 9,002,805 B1 | 4/2015 | Barber et al. |
| 9,003,144 B1 | 4/2015 | Hayes et al. |
| 9,009,491 B2 | 4/2015 | Resch |
| 9,021,297 B1 | 4/2015 | Hayes et al. |
| 9,047,214 B1 | 6/2015 | Northcott |
| 9,052,942 B1 | 6/2015 | Barber et al. |
| 9,092,441 B1 | 7/2015 | Patiejunas et al. |
| 9,110,797 B1 | 8/2015 | Lazier |
| 9,165,002 B1 | 10/2015 | Lazier |
| 9,208,018 B1 | 12/2015 | Northcott et al. |
| 9,213,485 B1 | 12/2015 | Hayes et al. |
| 9,213,709 B2 | 12/2015 | Patiejunas et al. |
| 9,218,244 B1 | 12/2015 | Hayes et al. |
| 9,223,789 B1 | 12/2015 | Seigle et al. |
| 9,225,675 B2 | 12/2015 | Patiejunas et al. |
| 9,244,761 B2 | 1/2016 | Yekhanin et al. |
| 9,250,811 B1 | 2/2016 | Patiejunas |
| 9,251,097 B1 | 2/2016 | Kumar et al. |
| 9,256,467 B1 | 2/2016 | Singh et al. |
| 9,256,761 B1 | 2/2016 | Sahu et al. |
| 9,271,052 B2 | 2/2016 | Holden |
| 9,274,956 B1 | 3/2016 | Salyers et al. |
| 9,281,845 B1 | 3/2016 | Lazier |
| 9,298,760 B1 | 3/2016 | Li et al. |
| 9,354,683 B2 | 5/2016 | Patiejunas et al. |
| 9,378,084 B2 | 6/2016 | Calder et al. |
| 9,384,147 B1 | 7/2016 | Morshed et al. |
| 9,405,333 B1 | 8/2016 | Pine |
| 9,448,614 B2 | 9/2016 | Slik |
| 9,459,959 B1 | 10/2016 | Franklin et al. |
| 9,495,249 B1 | 11/2016 | Franklin et al. |
| 9,495,255 B2 | 11/2016 | Davis et al. |
| 9,513,820 B1 | 12/2016 | Shalev |
| 9,559,889 B1 | 1/2017 | Vincent et al. |
| 9,563,681 B1 | 2/2017 | Patiejunas et al. |
| 9,672,110 B1 | 6/2017 | Patel |
| 9,753,669 B2 | 9/2017 | Ben-Shaul et al. |
| 9,785,495 B1 | 10/2017 | Lazier et al. |
| 9,792,179 B1 | 10/2017 | Lazier |
| 9,825,625 B2 | 11/2017 | Thalheim |
| 9,825,652 B1 | 11/2017 | Lazier |
| 9,838,041 B1 | 12/2017 | Lazier |
| 9,838,042 B1 | 12/2017 | Lazier |
| 9,853,662 B1 | 12/2017 | Lazier et al. |
| 9,866,242 B1 | 1/2018 | Lazier |
| 9,870,211 B2 | 1/2018 | Risbood et al. |
| 9,904,589 B1 | 2/2018 | Donlan et al. |
| 9,923,966 B1 | 3/2018 | Franklin et al. |
| 9,940,244 B2 | 4/2018 | Quimbey et al. |
| 9,998,539 B1 | 6/2018 | Brock et al. |
| 2002/0152104 A1* | 10/2002 | Ojha .................. G06Q 10/06 705/7.25 |
| 2003/0131198 A1 | 7/2003 | Wolrich et al. |
| 2003/0172325 A1 | 9/2003 | Wyatt et al. |
| 2003/0236961 A1 | 12/2003 | Qiu et al. |
| 2004/0040025 A1 | 2/2004 | Lehtinen |
| 2004/0054997 A1 | 3/2004 | Katragadda et al. |
| 2004/0128470 A1* | 7/2004 | Hetzler .............. G06F 12/0804 711/209 |
| 2004/0230764 A1 | 11/2004 | Merchant et al. |
| 2004/0268037 A1 | 12/2004 | Buchanan et al. |
| 2006/0004675 A1 | 1/2006 | Bennett et al. |
| 2006/0064709 A1 | 3/2006 | Throckmorton et al. |
| 2006/0074954 A1 | 4/2006 | Hartline et al. |
| 2006/0080574 A1 | 4/2006 | Saito et al. |
| 2006/0117217 A1 | 6/2006 | Chien et al. |
| 2006/0136928 A1 | 6/2006 | Crawford et al. |
| 2006/0168575 A1 | 7/2006 | Bhatt et al. |
| 2006/0168581 A1 | 7/2006 | Goger et al. |
| 2006/0184565 A1* | 8/2006 | Nishikawa ............ G06F 3/0605 |
| 2006/0212873 A1* | 9/2006 | Takahisa ............... G06F 9/5083 718/105 |
| 2006/0224431 A1* | 10/2006 | von Helmolt ......... G06Q 10/06 705/28 |
| 2006/0224603 A1* | 10/2006 | Correll, Jr. ......... G06F 17/30545 |
| 2006/0242156 A1 | 10/2006 | Bish et al. |
| 2007/0118657 A1 | 5/2007 | Kreitzer et al. |
| 2007/0124020 A1 | 5/2007 | Staples |
| 2007/0156842 A1 | 7/2007 | Vermeulen et al. |
| 2007/0179995 A1 | 8/2007 | Prahlad et al. |
| 2007/0180294 A1 | 8/2007 | Kameyama et al. |
| 2007/0245331 A1 | 10/2007 | Daynes et al. |
| 2008/0033914 A1 | 2/2008 | Cherniack et al. |
| 2008/0189705 A1 | 8/2008 | Weinert et al. |
| 2008/0222214 A1* | 9/2008 | Tokuda ............... G06F 11/1076 |
| 2009/0094250 A1 | 4/2009 | Dhuse et al. |
| 2009/0319078 A1 | 12/2009 | Jackson |
| 2010/0122033 A1 | 5/2010 | Gebara et al. |
| 2010/0131792 A1 | 5/2010 | Herrod |
| 2010/0138764 A1 | 6/2010 | Hatambeiki et al. |
| 2010/0153941 A1 | 6/2010 | Borissov et al. |
| 2010/0306267 A1 | 12/2010 | Zamkoff et al. |
| 2010/0318999 A1 | 12/2010 | Zhao et al. |
| 2010/0328528 A1 | 12/2010 | Eggert |
| 2010/0332751 A1 | 12/2010 | Quigley et al. |
| 2011/0022633 A1 | 1/2011 | Bernosky et al. |
| 2011/0055661 A1 | 3/2011 | Grube et al. |
| 2011/0078277 A1 | 3/2011 | Baptist |
| 2011/0202929 A1 | 8/2011 | Schleimer et al. |
| 2011/0225209 A1 | 9/2011 | Volvovski et al. |
| 2011/0225426 A1 | 9/2011 | Agarwal et al. |
| 2011/0264717 A1 | 10/2011 | Grube et al. |
| 2011/0289263 A1 | 11/2011 | McWilliams et al. |
| 2011/0296195 A1 | 12/2011 | Nakagawa et al. |
| 2011/0296440 A1 | 12/2011 | Laurich et al. |
| 2011/0307514 A1* | 12/2011 | Goodman .......... G06F 17/30545 707/770 |
| 2012/0011127 A1* | 1/2012 | Kim ................... G06F 17/30339 707/743 |
| 2012/0011398 A1 | 1/2012 | Eckhardt et al. |
| 2012/0017096 A1 | 1/2012 | Snider |
| 2012/0054367 A1 | 3/2012 | Ramakrishnan et al. |
| 2012/0079189 A1 | 3/2012 | Colgrove et al. |
| 2012/0079190 A1 | 3/2012 | Colgrove et al. |
| 2012/0110150 A1 | 5/2012 | Kosuru et al. |
| 2012/0131257 A1 | 5/2012 | Rudosky et al. |
| 2012/0185437 A1 | 7/2012 | Pavlov et al. |
| 2012/0243687 A1 | 9/2012 | Li et al. |
| 2012/0254089 A1 | 10/2012 | Alba et al. |
| 2012/0254175 A1 | 10/2012 | Horowitz et al. |
| 2012/0254690 A1 | 10/2012 | Resch et al. |
| 2012/0290539 A1 | 11/2012 | Bryant et al. |
| 2012/0310878 A1 | 12/2012 | Vuksan et al. |
| 2012/0322422 A1 | 12/2012 | Frecks, Jr. et al. |
| 2012/0331088 A1 | 12/2012 | O'Hare et al. |
| 2013/0007511 A1 | 1/2013 | Gaertner et al. |
| 2013/0029641 A1 | 1/2013 | Hickie |

(56) References Cited

U.S. PATENT DOCUMENTS

| | | |
|---|---|---|
| 2013/0073600 A1 | 3/2013 | Jenkins et al. |
| 2013/0109371 A1 | 5/2013 | Brogan et al. |
| 2013/0151653 A1 | 6/2013 | Sawicki et al. |
| 2013/0191527 A1 | 7/2013 | Ashok et al. |
| 2013/0238932 A1 | 9/2013 | Resch |
| 2013/0275776 A1 | 10/2013 | Baptist et al. |
| 2013/0297964 A1 | 11/2013 | Hegdal et al. |
| 2013/0304711 A1 | 11/2013 | Resch |
| 2013/0326583 A1 | 12/2013 | Freihold et al. |
| 2014/0006458 A1 | 1/2014 | Hsieh et al. |
| 2014/0006850 A1 | 1/2014 | Alley et al. |
| 2014/0007214 A1 | 1/2014 | Qureshi et al. |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047181 A1 | 2/2014 | Peterson et al. |
| 2014/0047190 A1 | 2/2014 | Dawkins et al. |
| 2014/0047261 A1 | 2/2014 | Patiejunas et al. |
| 2014/0108421 A1 | 4/2014 | Isaacson et al. |
| 2014/0122572 A1 | 5/2014 | Finkelstein et al. |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0173058 A1 | 6/2014 | Twitchell, Jr. |
| 2014/0189388 A1 | 7/2014 | Lynar et al. |
| 2014/0201541 A1 | 7/2014 | Paul et al. |
| 2014/0222778 A1 | 8/2014 | Nie et al. |
| 2014/0269484 A1 | 9/2014 | Dankberg et al. |
| 2014/0298134 A1 | 10/2014 | Grube et al. |
| 2014/0304356 A1 | 10/2014 | Allen, Sr. et al. |
| 2014/0310462 A1 | 10/2014 | Waldspurger et al. |
| 2014/0310571 A1 | 10/2014 | Fetterly et al. |
| 2014/0344446 A1 | 11/2014 | Rjeili et al. |
| 2014/0351632 A1 | 11/2014 | Grube et al. |
| 2014/0372383 A1 | 12/2014 | Sipek |
| 2014/0372693 A1* | 12/2014 | Yochai ............... G06F 12/0866 711/113 |
| 2014/0380126 A1 | 12/2014 | Yekhanin et al. |
| 2015/0149870 A1 | 5/2015 | Kozat |
| 2015/0154111 A1 | 6/2015 | D'Abreu et al. |
| 2015/0169716 A1 | 6/2015 | Franklin et al. |
| 2015/0268866 A1 | 9/2015 | Nakagawa |
| 2015/0278324 A1 | 10/2015 | Wong et al. |
| 2015/0324745 A1 | 11/2015 | Goodall et al. |
| 2015/0331635 A1 | 11/2015 | Ben-Shaul et al. |
| 2015/0355974 A1 | 12/2015 | Hayes et al. |
| 2015/0356005 A1 | 12/2015 | Hayes et al. |
| 2016/0011816 A1 | 1/2016 | Aizman |
| 2016/0034295 A1 | 2/2016 | Cochran |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0048399 A1 | 2/2016 | Shaw |
| 2016/0062623 A1 | 3/2016 | Howard et al. |
| 2016/0085797 A1 | 3/2016 | Patiejunas et al. |
| 2016/0092248 A1 | 3/2016 | Shani et al. |
| 2016/0179824 A1 | 6/2016 | Donlan et al. |
| 2016/0216991 A1 | 7/2016 | Ansari et al. |
| 2016/0286289 A1 | 9/2016 | Long et al. |
| 2016/0335310 A1 | 11/2016 | Lahiri et al. |
| 2017/0024281 A1 | 1/2017 | Franklin et al. |
| 2017/0060687 A1 | 3/2017 | Franklin et al. |
| 2017/0222814 A1 | 8/2017 | Oberhauser et al. |
| 2017/0250801 A1 | 8/2017 | Chen et al. |
| 2017/0331896 A1 | 11/2017 | Holloway et al. |

FOREIGN PATENT DOCUMENTS

| | | |
|---|---|---|
| WO | 02071382 A1 | 9/2002 |
| WO | 2014047073 A1 | 3/2014 |

OTHER PUBLICATIONS

Barr, "AWS Import/Export: Ship us That Disk!," Amazon Web Services Blog, May 21, 2009, retrieved Mar. 14, 2017, https://aws.amazon.com/blogs/aws/send-us-that-data/, 7 pages.

Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.

International Search Report and Written Opinion dated Aug. 25, 2016, International Patent Application No. PCT/US2016/040510, filed Jun. 30, 2016.

Storer et al., "POTSHARDS—A Secure, Recoverable, Long-Term Archival Storage System," ACM Transactions on Storage, Published Jun. 2009, vol. 5, No. 2, Article 5, pp. 5:1 to 5:35.

Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.

"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.

Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.

Franco, "Understanding Bitcoin: Cryptography, Engineering and Economics," Wiley, Nov. 24, 2014, 167 pages.

He et al., "Elastic Application Container: A Lightweight Approach for Cloud Resource Provisioning," 26th IEEE International Conference on Advanced Information Networking and Applications, Mar. 26, 2012, pp. 15-22.

International Organization for Standardization/ International Electrotechnical Commission, "Information technology—Trusted Platform Module—Part 1: Overview," International Standard, ISO/IEC 11889-1(E), May 15, 2009, 20 pages.

International Organization for Standardization/International Electrotechnical Commission, "Information technology Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

International Search Report and Written Opinion in International Patent Application No. PCT/US2015/050513, dated Feb. 16, 2016, 22 pages.

International Search Report and Written Opinion dated Feb. 4, 2016, International Patent Application No. PCT/US2015/059983, 12 pages.

International Search Report and Written Opinion dated Nov. 22, 2017, International Patent Application No. PCT/US2017/054319, filed Sep. 29, 2017, 14 pages.

Kim, "How Sharding Works," Medium, Dec. 5, 2014 [retrieved Nov. 17, 2017], https://medium.com/@jeeyoungk/how-sharding-works-b4dec46b3f6, 12 pages.

MacCarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.

Soltesz et al., "Container-based operating system virtualization: a scalable, high-performance alternative to hypervisors," ACM SIGOPS Operating Systems Review 41(3):275-287, Mar. 2007.

Swan, "Blockchain: Blueprint for a New Economy," O'Reilly Media, Inc., Jan. 22, 2015, 144 pages.

Trusted Computing Group, "TPM Main, Part 1 Design Principles," Specification Version 1.2, Level 2 Revision 103, Jul. 9, 2007, 182 pages.

(56) References Cited

OTHER PUBLICATIONS

Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 3 Commands," Specification Version 1.2, Revision 116, Mar. 1, 2011, 339 pages.
Van et al., "SLA-aware Virtual Resource Management for Cloud Infrastructures," IEEE Ninth International Conference on Computer and Information Technology, Oct. 11, 2009, pp. 357-362.
Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.
Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.
Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.
Xavier et al., "Performance evaluation of container-based virtualization for high performance computing environments," Parallel, Distributed and Network-Based Processing (PDP), 2013 21st Euromicro International Conference, Feb. 2013, pp. 233-240.
Zhao et al., "Experimental study of virtual machine migration in support of reservation of cluster resources," Proceedings of the 2nd international workshop on Virtualization technology in distributed computing, Nov. 2007, pp. 1-8.
Zheng et al., "Grid-partition index: a hybrid method for nearest-neighbor queries in wireless location-based services," The VLDB Journal—The International Journal on Very Large Data Bases 15(1):21-39, online publication Jul. 22, 2005, print publication Jan. 1, 2006.
Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Thiele et al., "Embedded Software in Network Processors—Models and Algorithms," Lecture Notes in Computer Science 2211:416-34, Oct. 8, 2001.
IEEE 100, "The Authoritative Dictionary of IEEE Standards Terms", Seventh Edition, IEEE Standards Information Network, IEEE Press, Dec. 2000, 5 pages (pertinent pages 1, 2, 155, 207, 1112).
Mickens et al., "Blizzard: Fast, Cloud-scale Block Storage for Cloud-oblivious Applications," Proceedings of the 11th USENIX Symposium on Networked Systems Design and Implementation, Apr. 2, 2014, 18 pages.
Third-Party Submission Under 37 CFR 1.290 dated Apr. 24, 2018, U.S. Appl. 15/283,017, filed Sep. 30, 2016, 10 pages.
European Office Action dated Nov. 6, 2018, Patent Application No. 16739357.8-1222, published May 9, 2018, 7 pages.
PC Plus, "How to turn an old netbook into a NAS drive," TechRadar, Mar. 1, 2010 [retreived Feb. 5, 2019], https://www.techradar.com/news/networking/routers-storage/how-to-turn-an-old-netbook-into-a-nas-drive-670757, 12 pages.

\* cited by examiner

TECHNIQUES AND SYSTEMS FOR SCALABLE REQUEST HANDLING IN DATA PROCESSING SYSTEMS

CROSS REFERENCE TO RELATED APPLICATIONS

This application incorporates by reference for all purposes the full disclosure of co-pending U.S. patent application Ser. No. 14/578,230, filed Dec. 19, 2014, entitled "TECHNIQUES FOR ADAPTING DATA STORAGE SYSTEMS FOR PEAKY USAGE MODELS," co-pending U.S. patent application Ser. No. 14/741,409, filed Jun. 16, 2015, entitled "ADAPTIVE DATA LOSS MITIGATION FOR REDUNDANCY CODING SYSTEMS," and co-pending U.S. patent application Ser. No. 14/789,783, filed Jul. 1, 2015, entitled "GRID ENCODED DATA STORAGE SYSTEMS FOR EFFICIENT DATA REPAIR."

BACKGROUND

Modern computer systems make extensive use of network computing and network data storage systems. Such use has proliferated in recent years, particularly in distributed or virtualized computer systems where multiple computer systems may share resources when performing operations and tasks associated with the computer systems. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and web services. The usage of network computing and network data storage allows customers to efficiently and to adaptively satisfy their varying computing needs, whereby the computing and data storage resources that may be required by the customers are added or removed from a large pool provided by a computing resource provider as needed.

The proliferation of network computing and network data storage, as well as the attendant increase in the number of entities dependent on network computing and network data storage, have increased the frequency and amplitude of demand spikes, and in some cases, such demand spikes are not easily predicted. Database services optimized to scale for certain types of increased demand, such as payload size, may not necessarily be capable of handling demand on a different access, such as requested transaction rate.

BRIEF DESCRIPTION OF THE DRAWINGS

Various techniques will be described with reference to the drawings, in which.

DETAILED DESCRIPTION

Figure 1:
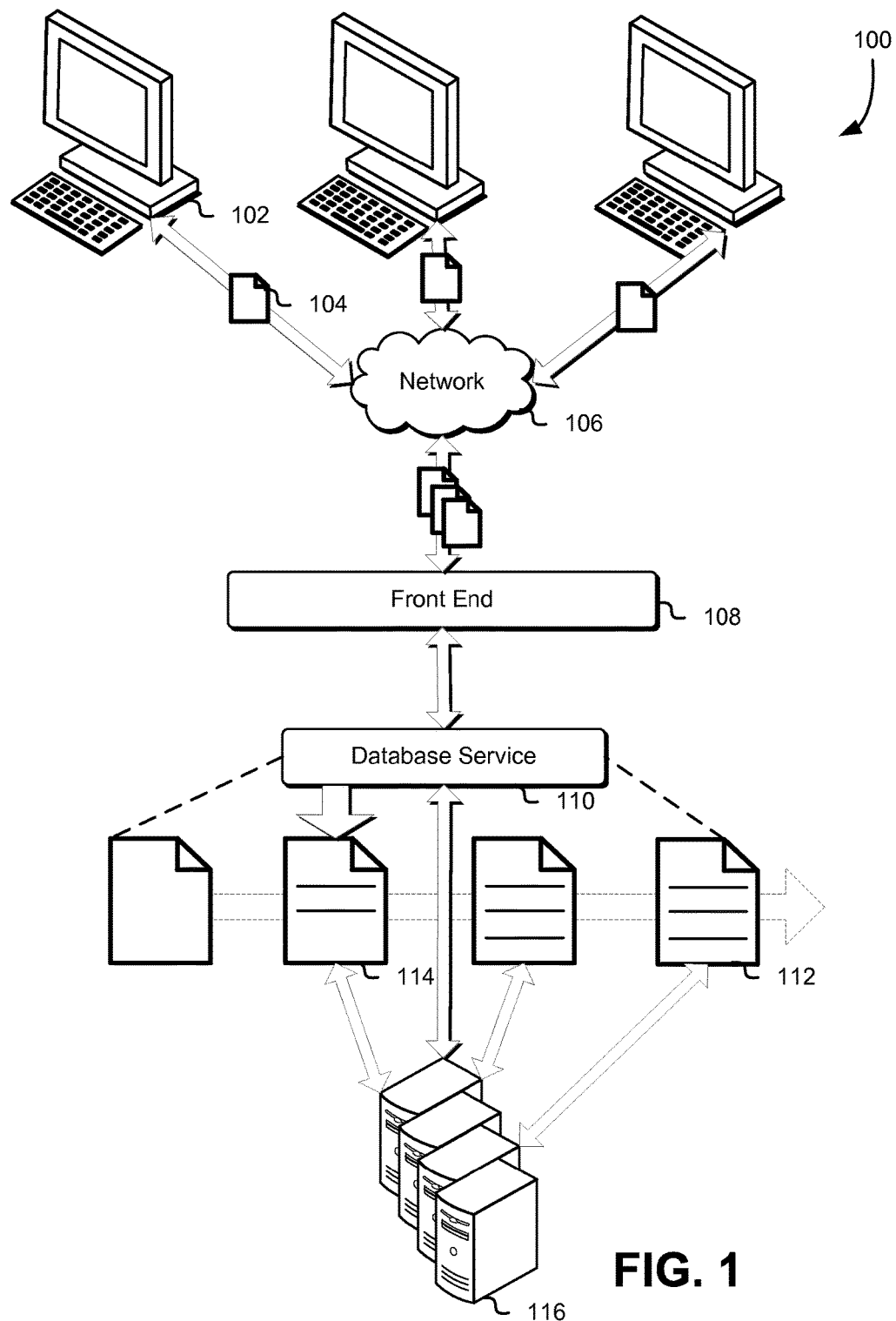
FIG. 1 illustrates an example environment in which a database service interacts with a data processing system, such as a data storage system, so as to process a plurality of incoming data processing requests in accordance with some embodiments.

In one example, a data processing system, such as a data storage system, uses a database service to track and update events related to various processing actions taken by the data storage system in connection with data processing requests received by, e.g., a front end of one or more services provided by a computing resource service provider. The data processing system may have an asynchronous component (e.g., components related to the data processing requested) and a synchronous component (e.g., servicing of status requests related to the data processing requests and the associated events). The synchronous component may be handled by, e.g., the database service.

The database service may automatically or manually apportion its processing capacity into processing partitions, each of which have a portion of the provisioned processing capacity. In some cases, the processing capacity may include either or both transactional capacity (e.g., maximum transaction rate, such as input/output operations per second (IOPS)) and payload capacity (e.g., in bytes, of the data object associated with the database entry, or of the entry itself). The database service may allocate one or more entries, such as events or requests, to the overall keyspace comprising the processing partitions, based on a value of, e.g., primary key entries for each of the events.

As may be contemplated, if the value used by the database service is random, rather than correlated, the overall keyspace may be used evenly without regard for usage patterns associated with the incoming events and requests. For example, if a given user or request generates a disproportionate number of events over a period of time, the use of an identifier, such as an identifier generated randomly, pseudo-randomly, stochastically, or deterministically (e.g., so as to achieve a specific distribution or correlation/decorrelation) for each of the events at the primary key allows the database service to avoid overloading any given processing partition, as the events are no longer assigned to the partitions in a correlated way. A schema that uses such an identifier as the primary key is described.

To aid synchronous processing related to, e.g., status requests and event updates related to the events tracked and updated using the techniques described, a secondary minimal index may be generated using the primary index. For example, if a random or pseudorandom identifier is used as the primary key of the primary index, a status lookup or rollup of all pending events for, e.g., a given account or request, may be expedited if the secondary minimal index uses the account identifier or request identifier as its primary key (and, as may be contemplated, is mapped to the primary index). Such a secondary minimal index may be generated and updated by the database service in connection with the addition of entries (e.g., events) to the primary index.

To further aid system efficiency, such as by limiting the amplitude of request burstiness, the database tables themselves may be rotated or cycled at a fixed or variable interval, either by number of pending requests per table or by period of time elapsed since the last database table was cycled. In some embodiments, the asynchronous data processing actions may be performed either sequentially (e.g., if the database tables are cycled in a queue-like structure), or in parallel (where the asynchronous processing component may pull its jobs from any populated table).

In the following description, various techniques will be described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment in which a database service interacts with a data processing system, such as a data storage system, so as to process a plurality of incoming data processing requests in accordance with some embodiments.

A customer device 102 or other entity connects with a front end 108 (e.g., of one or more services, such as a database service 110 and/or a data processing system 116), such as over a network 106, so as to transact data processing requests 104 for processing by the data processing system 116. In some embodiments, the data processing system 116 is a data storage system that provides, either directly or indirectly, a data storage service. Such a data storage service may, as further described herein, be capable of store payload (data) associated with the incoming data processing requests 104 on volumes of durable storage associated with the data storage service. In such embodiments, the incoming data may be subject to further processing, such as by application of a redundancy code to generate shards, in connection with storage on the durable storage. However, while many examples provided herein for data processing systems, data processing services, and data processing requests are in the context of data storage systems, data storage services, and data storage requests, respectively, data processing systems, services, and requests are not limited as such.

For example, data processing systems may be any systems capable of ingesting requests for manipulating data (in some cases, as attached thereto as payload), and processing the data in the fashion requested by the request. Examples include encryption systems, storage systems, data manglers, virtual computing services, and the like. Such data processing systems may have asynchronous and synchronous components. For example, a data processing system may ingest requests and provide confirmations, as well as respond to status requests related to the ingested requests, synchronously relative to the requests themselves (e.g., as received from the customer devices 102). However, the actions taken by a data processing system (e.g., 116) in accordance with the requests, such as to process the payload (e.g., for storage, in the case of a data storage system), may be performed asynchronously relative to the request.

The data processing requests, similarly, may be any requests for data manipulation or processing (e.g., by the subject data processing system 116). The data processing requests may include several attributes, either or both explicitly defined by the requestor (e.g., customer device 102) and/or implicit, which can include account identifiers, payload data to be processed, request expiration, the nature of the processing requested, request identifiers, the time of the request, the expiration of the request, and the like.

The customer device 102 may be any computing resource or collection of such resources enabling the customer to interface with the data processing system, such as in a programmatic fashion (e.g., via web service call or application programming interface call), and transact data therewith. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The network may be a communication network, such as the Internet, an intranet or an Internet service provider (ISP) network. Some communications from the customer device to the data processing system may cause the data processing system to operate in accordance with one or more embodiments described or a variation thereof. The front end through which the data processing service, as well as other services as further described herein, operates, may be any entity capable of interfacing via the network with the customer device 102, as well as various other components of a data processing system, so as to coordinate and/or direct data and requests to the appropriate entities. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices (such as hard drives, optical drives, solid state devices, virtual storage devices such as provided by the computing resource service provider, and the like), services (e.g., such as those accessible via application programming interface calls, web service calls, or other programmatic methods), and the like.

The data processing requests 104 may be produced by a program, process, application, module, service, or system associated with a computing resource service provider as described herein. The data processing requests 104 may also be produced by a user or customer of the computing resource service provider, and submitted to the computing resource service provider via a customer device and transmitted via a network. The data processing request may include volatile data, which may be added to, changed, and/or deleted from in response to, for example, one or more requests (e.g., application programming interface requests or "API requests") made by the user or customer of the computer system. The data processing request may also include non-volatile data (also referred to herein as "static data"), which may be at least partially unchanging as the one or more requests are received.

In examples where the data processing system 116 is a data storage service, the data stored across associated durable storage volumes, such as in a bundle of shards, may have an associated durability that may be based on, for example, an annual failure rate ("AFR") of the data storage volume or the mapped data storage volume. For a given AFR, it may be assumed that the daily failure rate ("DFR") for the data storage volume or the mapped data storage volume is the AFR divided by three-hundred and sixty-five (i.e., the number of days in a year) and the hourly failure rate ("HFR") of the data storage volume or the mapped data storage volume is the DFR divided by twenty-four (i.e., the number of hours in a day). For example, if a data storage volume or the mapped data storage volume has an AFR of 2 percent, the data storage volume or the mapped data storage volume has a DFR of 0.0055 percent and an HFR of 0.00023 percent.

In such examples, when the data is migrated or otherwise stored via an associated data storage service, e.g., after encryption, the data storage service may store the data using one or more redundancy encoding techniques such as those described herein. For example, the data storage service may encode the data by producing one or more data shards and may store the one or more data shards on one or more volumes of a set of volumes of durable storage configured to store the redundancy encoded data as described herein. Depending on the redundancy encoding technique used by the data storage service, some or all of the shards stored may consist entirely of original data (identity shards) or derived data (derived shards). In some embodiments, the shards may be apportioned on a one-to-one basis to the volumes of durable storage. Accordingly, in such embodiments, some volumes may include directly readable, original data (identity shards), while others contain only derived data (derived shards). In the illustrated example, the encrypted data is stored within one of the identity shards, and the shards comprise a bundle of shards, which may be encoded such that a minimum quorum quantity of the shards within the bundle may be used to reconstruct any of the data represented therewith.

If, for example, the illustrated bundle of shards has a minimum quorum quantity of two shards out of the three illustrated, any two of the bundle of shards—regardless of whether the shard is an identity shard or a derived shard, may be processed using the redundancy code so as to regenerate the data, e.g., encrypted data. Additionally, the original data may be regenerated by directly reading the identity shards.

It should be noted that, as used herein, the durability of data and/or data storage may be separate from the redundancy of the data in the data storage. For example, data stored in preliminary storage (as described in connection with FIG. 2) may be highly durable (i.e., have a very low failure rate) but may not be redundant if, for example, it is stored as a single copy. Conversely, data stored using one or more redundancy encoding techniques such as those described herein and while such data may be less durably stored (i.e., may have fewer "9's" of durability), it may be highly redundant. For example, data stored in a grid may have no fewer than four separate copies of the data (one of the data shard, one from the horizontally-derived shards, one from the vertically-derived shards, and one from the remaining shards). If the grid is geographically distributed into, for example, multiple datacenters in multiple geographic regions, the data may have greater redundancy due to the added tolerance for loss of a complete datacenter.

The data processing requests 104 are submitted, as previously mentioned, via the network 106 to a front end 108 (described in connection with FIG. 2) for one or more services, e.g., provided by the computing resource service provider. The front end 108 may route the data processing requests to a database service 110 which, in some embodiments, administers or assists in the administration of synchronous components of a data processing service, such as of a data processing system 116.

The database service 110 may be any service or system that provides for organization, collection, and retrieval of data (e.g., metadata), which may include schemas, tables, queries, events, and the like. The database service may be connected to other components via a network. In some embodiments, the database service 110 communicates with other components in programmatic fashion, such as by the use of application programming interfaces (APIs), web services, and the like. The database service 110 may be capable of scaling for demand within a given level of provisioned or overall capacity (such as the capacity allocated by a requesting customer or other entity) by the use of processing partitions, each of which provides a portion of the provisioned or overall capacity. For example, at a nominal level of activity, the database service 110 may allocate events, requests, etc. to a single processing partition that provides the full provisioned capacity of the database service. However, over a given threshold of activity, the database service 110 may "split" the processing partition in two, three, or more partitions, and may continue to do so as activity increases. Similarly, partitions may be removed as activity decreases. The overall keyspace available for allocation, as may be contemplated, may also be partitioned accordingly. In some embodiments, the database service allocates incoming events and other entries according to the value of an identifier for each entry, which, in some embodiments, is the primary key of the primary index to which the items are allocated (e.g., a primary database table). The activity, as well as the capacity, may be on any relevant axis. Examples include transactional capacity (e.g., the number of input/output operations per unit time, e.g., IOPS), payload capacity (e.g., in bytes), request capacity (e.g., in bytes or in unit quantity (number of requests)), and the like.

The database service 110 may implement a rotation, queue, or other shifting of database tables 112, 114, and may write incoming requests and associated processing events to a different database table after, e.g., a period of time (e.g., after a variable or fixed length of time), after n requests have been written to a given database table, based on a level of incoming activity (e.g., request frequency or volume, peakiness, etc.). As the database tables rotate, the database service may respond synchronously to any requests related to prior data processing requests (e.g., status requests or requests to update prior data processing requests) by directly manipulating the database tables 112, 114, including those tables which are still actively receiving new events/requests (114). Meanwhile, in some embodiments, the data processing system 116 may asynchronously process the events written to the database tables 114, 112, in any order, e.g., as determined by the data processing system 116 or related entity based on an expectation of completion time, for system efficiency reasons, and the like. Accordingly, the synchronous and asynchronous components of such a data processing system 116 may be effectively separated so as to improve the operational efficiency of both.

For certain synchronous operations relating to events written to the database tables 112, 114, a schema implementing a random, pseudorandom, stochastic (or stochastically generated), or deterministically generated identifier for each event, as well as a minimal secondary index generated in connection with the primary index, may be used so as to improve the operational efficiency of the database service in servicing those synchronous operations. These techniques and systems are further discussed below in connection with FIG. 3.

Figure 2:
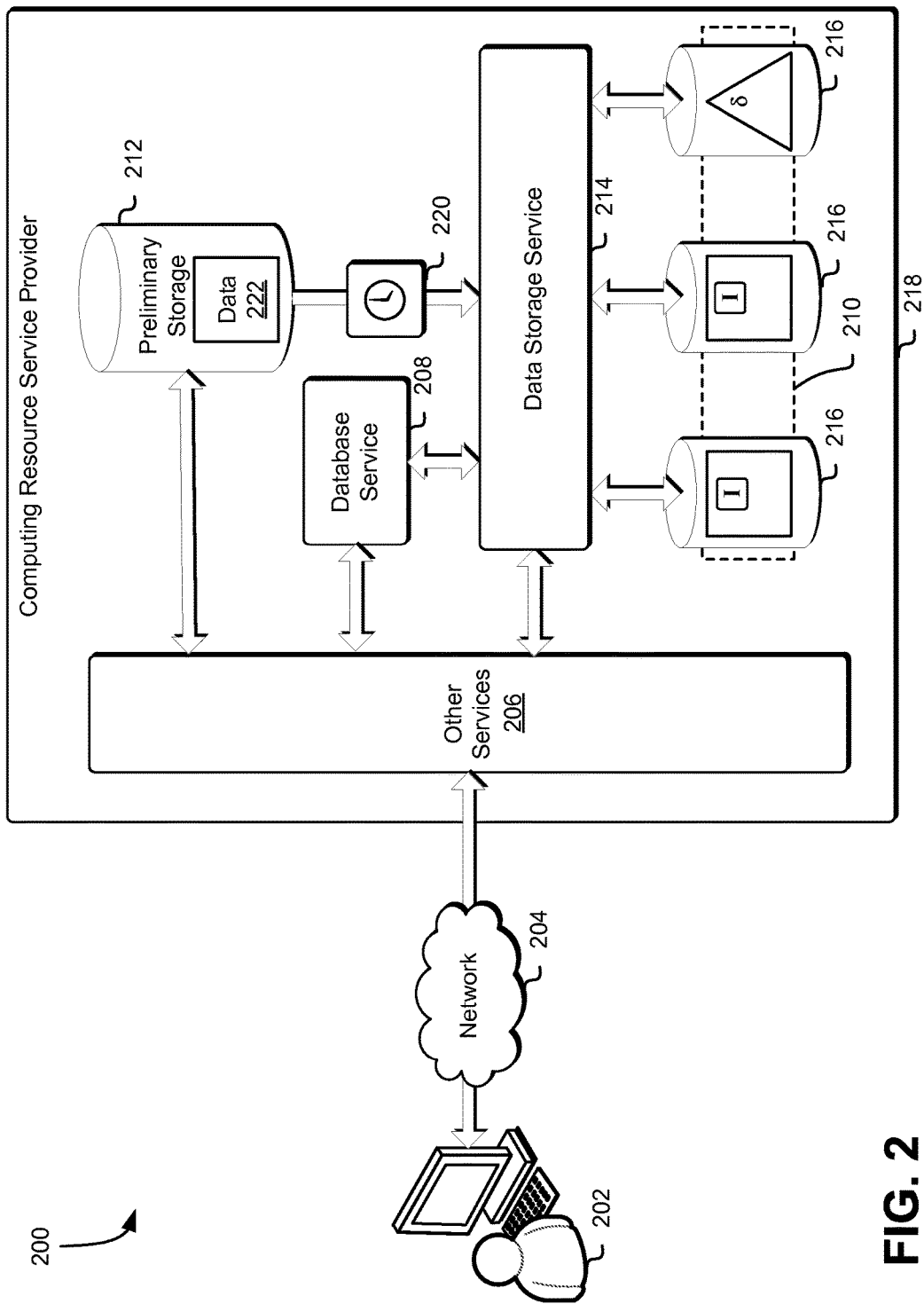
FIG. 2 illustrates an example environment in which a computing resource service provider implements a database service to synchronously track and administer the further servicing of data processing requests, such as data storage requests, in accordance with some embodiments.

FIG. 2 illustrates an example environment in which a computing resource service provider implements a database service to synchronously track and administer the further servicing of data processing requests, such as data storage requests, in accordance with some embodiments.

A customer, via a customer device 202, may connect via a network 204 to one or more services 206 provided by a computing resource service provider 218. In some embodiments, the computing resource service provider 218 may provide a distributed, virtualized and/or datacenter environment within which one or more applications, processes, services, virtual machines, and/or other such computer system entities may be executed. In some embodiments, the customer may be a person, or may be a process running on one or more remote computer systems, or may be some other computer system entity, user, or process. The customer device 202 and the network 204 may be similar to that described in connection with at least FIG. 1 above.

The command or commands to connect to the computer system instance may originate from an outside computer system and/or server, or may originate from an entity, user, or process on a remote network location, or may originate from an entity, user, or process within the computing resource service provider, or may originate from a user of the customer device 202, or may originate as a result of an automatic process or may originate as a result of a combination of these and/or other such origin entities. In some embodiments, the command or commands to initiate the connection to the computing resource service provider 218 may be sent to the services 206, without the intervention of the user of the services 206. The command or commands to initiate the connection to the services 206 may originate from the same origin as the command or commands to connect to the computing resource service provider 218 or may originate from another computer system and/or server, or may originate from a different entity, user, or process on the same or a different remote network location, or may originate from a different entity, user, or process within the computing resource service provider, or may originate from a different user of the customer device 202, or may originate as a result of a combination of these and/or other such same and/or different entities.

The customer device 202 may request connection to the computing resource service provider 218 via one or more connections and, in some embodiments, via one or more networks 204 and/or entities associated therewith, such as servers connected to the network, either directly or indirectly. The customer device 202 that requests access to the services 206 may, as previously discussed, include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network 204, also as previously discussed, may include, for example, a local network, an internal network, a public network such as the Internet, or other networks such as those listed or described herein. The network may also operate in accordance with various protocols such as those listed or described herein.

The computing resource service provider 218 may provide access to one or more host machines as well as provide access to services such as virtual machine (VM) instances, automatic scaling groups, or file-based database storage systems as may be operating thereon. The services 206 may connect to or otherwise be associated with one or more storage services such as those described herein (e.g., the data storage service 214). The storage services may be configured to provide data storage for the services 206. In an embodiment, the computing resource service provider 218 may provide direct access to the one or more storage services for use by users and/or customers of the computing resource service provider. The storage services may manage storage of data on one or more block storage devices and/or may manage storage of data on one or more archival storage devices such as, for example, magnetic tapes.

For example, the computing resource service provider 218 may provide a variety of services 206 to the customer device 202, which may in turn communicate with the computing resource service provider 218 via an interface, which may be a web service interface, application programming interface (API), user interface, or any other type of interface. The services 206 provided by the computing resource service provider 218 may include, but may not be limited to, a virtual computer system service, a block-level data storage service, a cryptography service, an on-demand data storage service, a notification service, an authentication service, a policy management service, an archival storage service, a durable data storage service such as the data storage service 214, and/or other such services. Each of the services 206 provided by the computing resource service provider 218 may include one or more web service interfaces that enable the customer device 202 to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service or the data storage service 214, and/or to access one or more block-level data storage devices provided by the block-level data storage service).

The block-level data storage service may comprise one or more computing resources that collectively operate to store data for a user using block-level storage devices (and/or virtualizations thereof). The block-level storage devices of the block-level data storage service may, for example, be operationally attached to virtual computer systems provided by a virtual computer system service to serve as logical units (e.g., virtual drives) for the computer systems. A block-level storage device may enable the persistent storage of data used or generated by a corresponding virtual computer system where the virtual computer system service may be configured to only provide ephemeral data storage.

The computing resource service provider 218 may also include an on-demand data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, to allow data to be provided in response to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the user to retrieve or perform other operations in connection with the data objects stored by the on-demand data storage service.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

The services 206 may produce data, such as data received from the customer device 202, which may be stored 222 in the preliminary storage 212 as described above. In some embodiments, as previously mentioned, the data stored in the preliminary storage may be stored in unaltered form, such as in an identity shard. While the data is stored in the preliminary storage 212, the data 222 may be accessed by the services 206 (e.g., as a result of one or more API requests by the customer device 202) from the preliminary storage 212. After a determined period 220, such as described above in connection with FIG. 1, has passed and the data is migrated to a data storage service 214 provided by the computing resource service provider 218, the data may be accessed using the data storage service 214. In an embodiment where the data may be stored using redundancy encoding technique such as those described herein, the data storage service 214 may retrieve the data from any of the data volumes 216 and/or may reconstruct the data using the redundancy encoding techniques. The data volumes 216 may be magnetic tape, may be optical disks, or may be some other such storage media. As previously discussed and as further discussed herein, the data may be stored in identity shards that correspond individually to volumes, and may also be processed (using the redundancy encoding techniques) so as to create derived shards.

The data storage service 214 may store the data 222 in the preliminary storage 212 or may transmit a command that causes a different service (e.g., a block storage service or some other storage service such as those described herein) to store the data 222 in the preliminary storage 212. The data storage service 214 may also cause the data to be migrated from the preliminary storage 212 or may transmit a command that causes a different service to cause the data to be migrated from the preliminary storage 212. The data storage service 214 may also transmit a command or commands to cause a different service to perform other operations associated with making data objects eventually durable including, but not limited to, storing the data objects in the data shards, calculating derived shards, updating bundles, updating grids (i.e., updating horizontal, vertical, and other bundles of multiply bundled data), and/or other such operations.

In an embodiment, the preliminary storage 212 is a data storage volume such as, for example, a magnetic disk drive (e.g., a spinning disk drive or a solid state disk drive), computer system memory, magnetic tape, or some other optical storage device. In another embodiment, the preliminary storage 212 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the preliminary storage 212 described herein are illustrative examples and other types of data storage volumes used for the preliminary storage 106 may be considered as within the scope of the present disclosure.

In an embodiment, the preliminary storage 212 is a plurality of storage devices that are used to redundantly store the data using techniques such as, for example, bundle encoding, grid encoding, or replicated storage. For example, the preliminary storage 212 may store the data by distributing the data to a plurality of data shards (e.g., putting a first portion of the data in a first data shard and a second portion of the data in a second data shard) and generating one or more derived shards based on those data shards. In another embodiment, the preliminary storage 112 is one or more storage devices that store redundant copies of the data as received. In yet another embodiment, the preliminary storage uses a combination of the storage techniques described herein by, for example, storing a single copy of the data for a first time period (e.g., thirty minutes), storing multiple copies of the data for a second time period (e.g., one day), using redundant storage techniques such as grid or bundle encoding to store the data for a third time period (e.g., thirty days), and then moving the data to more durable storage 216 using the data storage service 214 as described herein.

The set of data may be stored in the preliminary storage 212 in an unaltered form (e.g., not processed, compressed, indexed, or altered prior to storage). The set of data may also be stored in the preliminary storage 212 as, for example, original data (also referred to herein as an "identity shard") such as the original data shards described herein. In an embodiment, the set of data stored in the preliminary storage 212 is stored without indexing and without any redundancy encoding. In another embodiment, the set of data stored in the preliminary storage 212 is stored with null redundancy encoding (i.e., a redundancy encoding that maps the data to itself). The data in preliminary storage may be stored as raw data, or may be bundle-encoded, or may be grid-encoded, or may be stored using some other method.

In an embodiment, data can be migrated from preliminary storage to the data storage service 212 as a result of an event such as, for example, a request by a customer to store the data in the data storage service 214. Other events may also be used to cause the migration of the data from preliminary storage 212 to the data storage service 214 such as, for example, events generated by a process, module, service, or application associated with the customer or associated with a computing resource service provider. In an illustrative example, a block storage service may maintain data storage in preliminary storage for a running virtual machine instance and, upon termination of the instance, may generate an event to migrate some or all of the data from preliminary storage to durable storage. The triggering event that causes the migration of data from preliminary storage may also be combined with an elapsed time as described above so that, for example, data may be stored in preliminary storage until an event occurs, but the data may also be migrated from preliminary storage if no event occurs prior to the elapsed time. As may be contemplated, the criteria for initiating the migration from preliminary storage described herein are illustrative examples and other such criteria for initiating the migration from preliminary storage may be considered as within the scope of the present disclosure.

As used herein, the durability of a data object may be understood to be an estimate of the probability that the data object will not unintentionally become permanently irretrievable (also referred to herein as "unavailable"). This durability is an estimated probability and is generally expressed as a percentage (e.g., 99.9999 percent). This durability is based on assumptions of probabilities of certain failures (e.g., the AFR of drives used to store the data) and may be based on an average failure rate, a maximum failure rate, a minimum failure rate, a mean failure rate, or some other such failure rate. The durability may be based on a statistical average of the failure over a collection of drives when there are many different drives and/or when there are many different types of drives. The durability may also be based on historical measurements of the failure of drives and/or statistical sampling of the historical measurements of the failure of drives. The durability may also be correlated with the probability that a data object will not unintentionally become unavailable such as, for example, basing the durability on the probability that a data object will unintentionally become unavailable. As may be contemplated, the methods of determining durability of data described herein are merely illustrative examples and other such methods of determining durability of data may be considered as within the scope of the present disclosure.

In an embodiment, a separate service can be configured to monitor the elapsed time associated with the data objects in preliminary storage 212 and, based on a desired durability, cause the data storage service 214 to cause the data to be migrated from the preliminary storage 212 to the durable storage by, for example, transmitting a message to the data storage service. This separate service may operate asynchronously to enforce time limits for all such data stored in preliminary storage.

The volumes 216 may contain shards associated with a bundle 210, which may in turn contain encrypted data that was encrypted prior to redundancy coding or being associated with the bundle 210. Additionally, in some embodiments, a database service 208 may be implemented by the computing resource service provider 218, and the data storage service 214 may interact with the database service 208 so as to organize and/or provide a controlled flow of requests into and out of the data storage service 214, such in connection with processing the data 222 for storage on the durable storage 216 (e.g., via a redundancy code).

The database service 208 may, as previously discussed, programmatically interact with other entities (e.g., other services 206, such as a front end for the database service 208 and the data storage service 214) and store events and other entries in one or more database tables according to one or more schemas. In some embodiments, also as previously discussed, the database service 208 may be capable of scaling for demand within a given level of provisioned or overall capacity (such as the capacity allocated by a requesting customer or other entity) by the use of processing partitions, each of which provides a portion of the provisioned or overall capacity. For example, at a nominal level of activity, the database service 208 may allocate events, requests, etc. to a single processing partition that provides the full provisioned capacity of the database service. However, over a given threshold of activity, the database service 208 may "split" the processing partition in two, three, or more partitions, and may continue to do so as activity increases. Similarly, partitions may be removed as activity decreases. The overall keyspace available for allocation, as may be contemplated, may also be partitioned accordingly. In some embodiments, the database service allocates incoming events and other entries according to the value of an identifier for each entry, which, in some embodiments, is the primary key of the primary index to which the items are allocated (e.g., a primary database table). The activity, as well as the capacity, may be on any relevant axis. Examples include transactional capacity (e.g., the number of input/output operations per unit time, e.g., IOPS), payload capacity (e.g., in bytes), request capacity (e.g., in bytes or in unit quantity (number of requests)), and the like.

Figure 3:
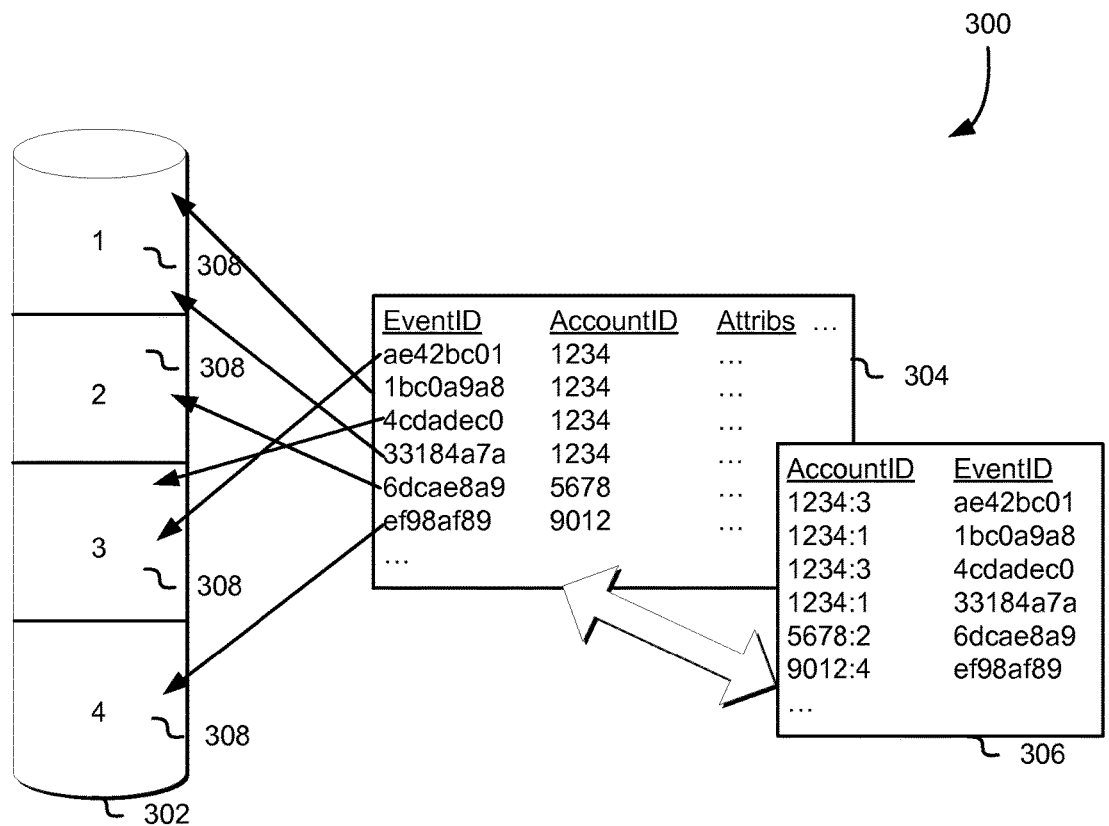
FIG. 3 illustrates an example of how a database service may organize information related to events associated with data processing requests, in accordance with some embodiments.

FIG. 3 illustrates an example of how a database service may organize information related to events associated with data processing requests, in accordance with some embodiments.

As previously mentioned in connection with FIGS. 1 and 2, a database service 302 (depicted to schematically show a relative level of processing capacity) may be implemented to "split" its capacity into one or more processing partitions 308 (four are exemplarily shown) as demand on the database service 302 increases and decreases. Also as previously described, the database service 302 may allocate a given entry (e.g., a given event, which may map many-to-one to incoming requests) to the overall keyspace (as shown in FIG. 3 as the cylindrical object) based on a value of the column selected as the primary key for the primary index. As may be contemplated, if the selected primary key causes significant correlation between an assigned partition within the keyspace and bursty behavior (e.g., a given account generating a disproportionately large number of entries/events), a large number of entries may be allocated to the same processing partition 308, thereby potentially overloading the capacity allocated thereto while the actual full capacity of the database service 302 remains underutilized.

In such embodiments, a schema is implemented such that the primary index 304 uses a generated identifier as the primary key. In these embodiments, each entry is given a generated identifier that, in some cases, may encapsulate other information relating to the entry/event. The generated identifier may be generated randomly, pseudorandomly, stochastically, or deterministically (e.g., so as to decorrelate the entries/events from one another, given the properties of the processing partitions to which they are allocated). As such, if the database service 302 allocates entries/events to partitions within the overall keyspace using a randomly generated value, the distribution across the keyspace is no longer correlated with any given partition, regardless of the burstiness of the behavior reflected by the entries of the primary table 304.

For implementations where database operations (e.g., status requests, event updates, etc.) benefit from database lookups based on or sorted by a primary key (e.g., "provide all pending events for AccountID n") the database service 302 may further implement a secondary minimal index 306 that uses a different column or set of values (e.g., attributes) across the entries of the primary index 304 as its primary key. For example, as illustrated, the minimal secondary index 306 may use the AccountID field of the primary index as its primary key. So as to further aid lookups, the partition to which the entry/event is allocated may also be encapsulated in the value within that field (also as illustrated).

In such implementations, an incoming status request or other subrequest related to existing events/requests/entries may be serviced synchronously by the database service 302 by first looking to the minimal secondary index 306, then looking up any specific attributes related to those eventIDs and, e.g., causing the relevant processing partition for each of those events to update or otherwise manipulate those events as necessary. Multiple minimal secondary indexes may, in some cases, be generated for different types of expected lookups (e.g., based on other attributes).

Figure 4:
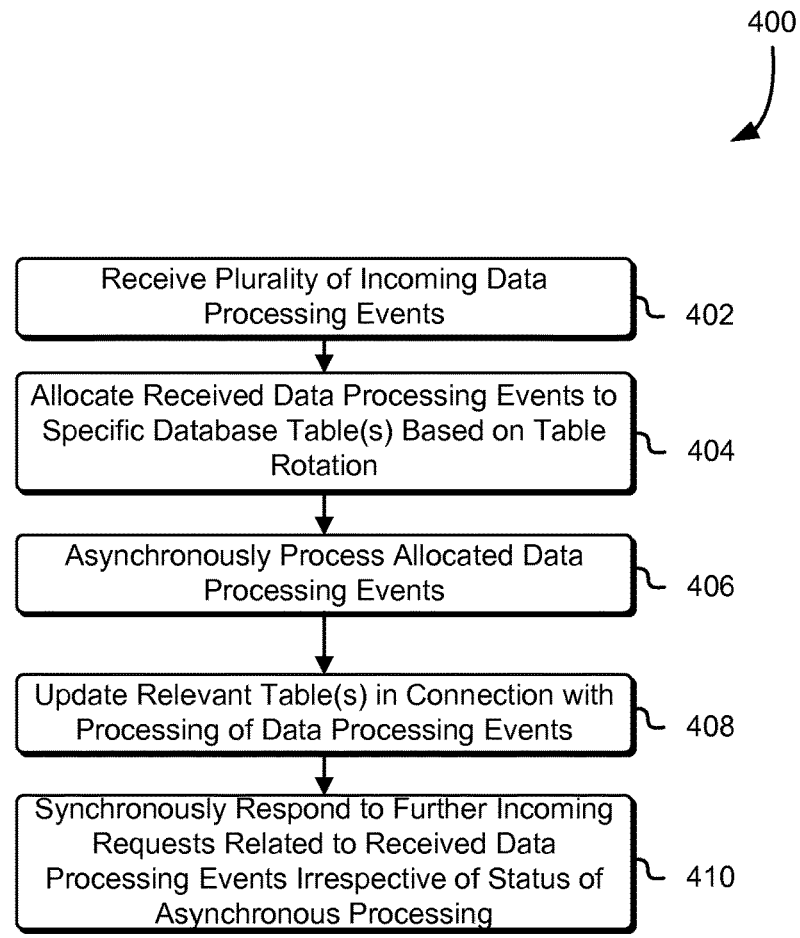
FIG. 4 illustrates an example process in which data processing events may be allocated via a database service so as to isolate asynchronous and synchronous components of a data processing system, in accordance with some embodiments.

FIG. 4 illustrates an example process in which data processing events may be allocated via a database service so as to isolate asynchronous and synchronous components of a data processing system, in accordance with some embodiments.

At step 402, a plurality of incoming data processing events, such as data storage events associated with data storage requests of one or more customer devices as previously described, is received by, e.g., a front end or other services of a computing resource service provider as described above in connection with FIG. 2. As mentioned, the data processing events may map many-to-one to a given incoming data processing request.

At step 404, an entity, such as a database service, allocates the data processing events received in connection with step 402 to one or more database table(s) based on a table rotation queue, or other process that switches the database table(s) after a period of time, which may be variable or fixed. At step 406, an asynchronous set of components, such as of a data processing system (e.g., a data storage system) processes the events/entries written to the database tables in a fashion that is independent of the synchronous processing/handling of the events (e.g., by the database service).

At step 408, the asynchronous processing at step 406 generates one or more events or updates to existing events in the database tables, and such updates or new events are written to the relevant database tables by, e.g., the database service. For example, if the data processing request is a data storage request, an update may be generated upon successful completion of the data storage, and the update may be performed on an existing event, on the same database table, that caused the data storage operation to be initiated in the first instance.

At step 410, while the asynchronous processing of step 406 and 408 is taking place, status requests and other requests that relate to prior-allocated events (e.g., at step 404) are serviced synchronously by, e.g., the database service, using one or more relevant database tables, in a fashion that is independent of the asynchronous processes of step 406. For example, a status request of a prior-filed data processing request may be performed synchronously without involvement from the asynchronous components actually tasked with performing the requested data processing.

Figure 5:
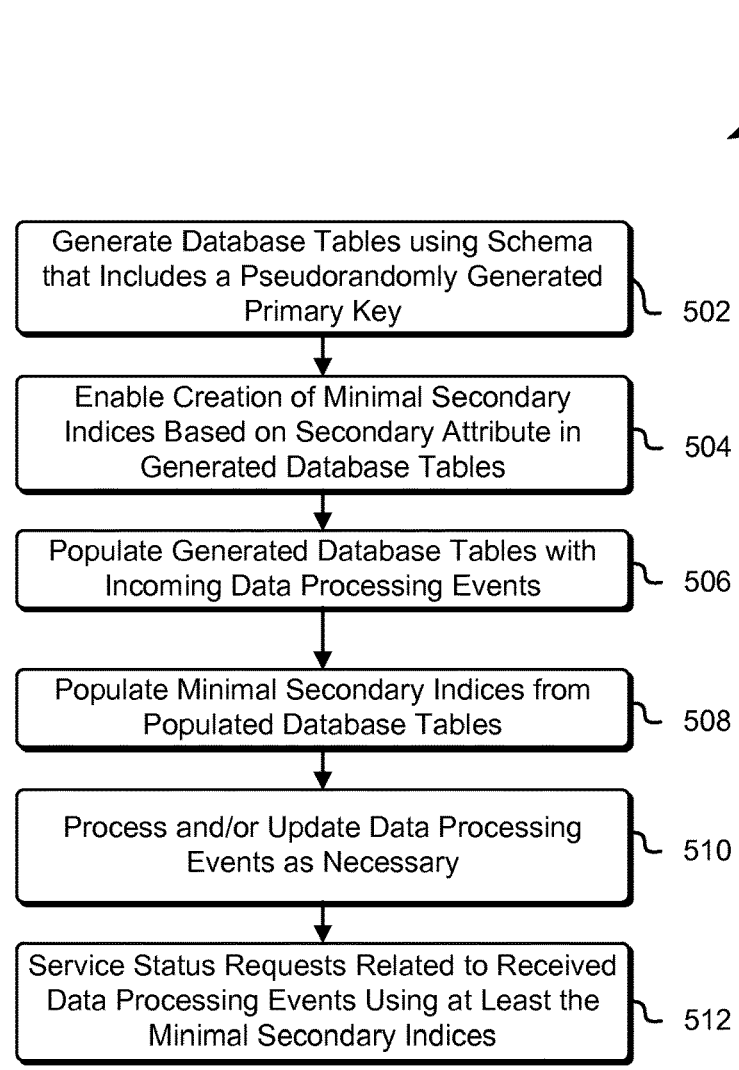
FIG. 5 illustrates an example process for implementing a minimal secondary index for processing status requests related to events recorded and managed by a database service, in accordance with some embodiments.

FIG. 5 illustrates an example process for implementing a minimal secondary index for processing status requests related to events recorded and managed by a database service, in accordance with some embodiments.

At step 502, a database service generates database tables using a schema that uses an identifier, such as a pseudo-randomly generated identifier, for each entry as the field for the primary key of the primary index of the database tables. As previously discussed, in some embodiments, the database service utilizes processing partitions, to which a portion of the overall processing capacity of the database service (or provisioned amount thereof) is allocated, and the database service may further adjust the number of partitions between which to spread the capacity based on some measure of load.

At step 504, the database service generates minimal secondary indices based on a secondary attribute of the database tables generated in connection with step 502. For example, the secondary indices may be generated based on sorting or lookup types enabled by a published application programming interface (API), and may use such information to create one or more minimal secondary indices that use different primary keys (e.g., attribute fields extant within the primary index, but other than the primary key of the primary index).

At step 506, incoming events, requests, and other entries are processed so as to be stored in the primary indices according to the selected schema, and each entry is assigned an identifier, such as a pseudorandom identifier, according to step 502. At step 508, the minimal secondary indices enabled in step 504 are generated from the primary database tables populated in connection with step 506.

At step 510, the data processing events recorded in connection with steps 506-508 are processed and/or updated, synchronously or asynchronously as applicable, on an ongoing basis, by, e.g., the database service and/or a data processing system, such as a data storage system. At step 512, any incoming status requests related to events/entries populated in the database tables (e.g., at steps 504 and 506), are serviced by, e.g., the database service, according to an appropriate minimal secondary index as generated in step 504 and populated in step 508.

Figure 6:
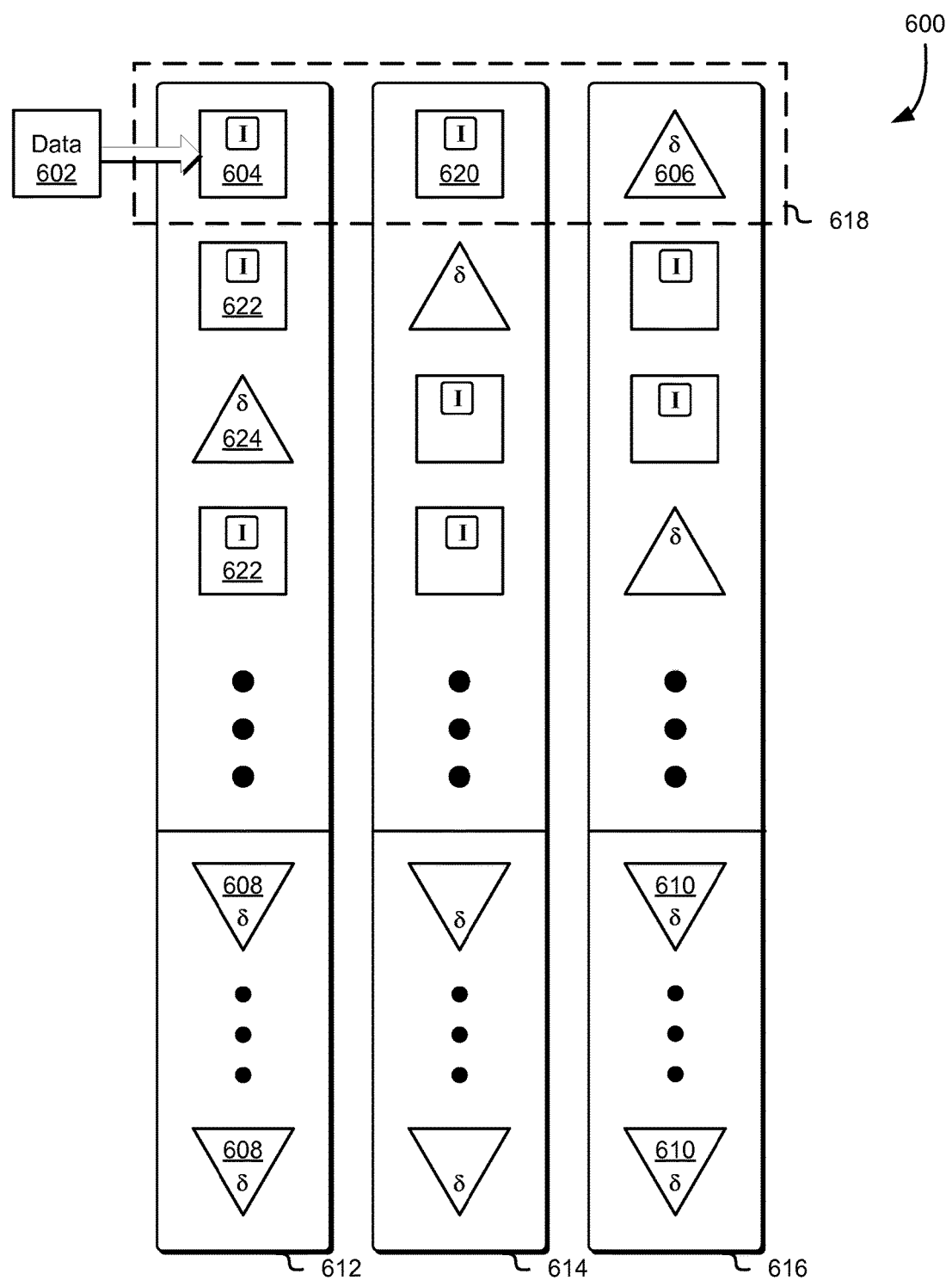
FIG. 6 illustrates an example environment where a redundancy encoding technique is applied to data stored in durable storage in accordance with at least one embodiment.

FIG. 6 illustrates an example environment 600 where a redundancy encoding technique is applied to data stored in durable storage as described in connection with FIG. 1 and in accordance with an embodiment. The redundancy encoding technique illustrated in FIG. 6 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 6, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR," which is incorporated by reference herein.

In the example illustrated in FIG. 6, data 602 from preliminary storage is provided for storage in durable storage using a redundancy encoding technique with both horizontal derived shards and vertical derived shards. In the example illustrated in FIG. 6, a first datacenter 612 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first datacenter 612. A second datacenter 614, which may be geographically and/or logically separate from the first datacenter 612, may also contain data shards, horizontal derived shards, and/or vertical derived shards. A third datacenter 616, which may be geographically and/or logically separate from the first datacenter 612 and from the second datacenter 614, may also contain data shards, horizontal derived shards, and/or vertical derived shards. As illustrated in FIG. 6, each of the three datacenters may be a single vertical bundle. In an embodiment, each of the datacenters can include multiple vertical bundles. As may be contemplated, the number of datacenters illustrated in FIG. 6 and/or the composition of the datacenters illustrated in FIG. 6 are merely illustrative examples and other numbers and/or compositions of datacenters may be considered as within the scope of the present disclosure. The datacenters may be co-located or may be located in one or more separate datacenter locations.

In the example illustrated in FIG. 6, the data 602 may be copied to a data shard 604 and, as a result of the change to the data in the data shard 604, a horizontal derived shard 606 associated with the data shard 604 may be updated so that the horizontal derived shard 606 may be used to reconstruct the data shard 604 in the event of a loss of the data shard 604. In the example illustrated in FIG. 6, the three shards enclosed by the dotted line (e.g., the data shard 604, the data shard 620, and the horizontal derived shard 606) are a horizontal bundle 618. In this example, the data shard 620 is not affected by the changes to the data shard 604 but the horizontal derived shard 606 may need to be updated as a result of the changes to the data shard 604.

Also as a result of the change to the data in the data shard 604, one or more vertical derived shards 608 related to the data shard 604 may also be updated so that the vertical derived shards 608 may be used to reconstruct the data shard 604 in the event of a loss of the data shard 604 and the horizontal derived shard 606. In the example illustrated in FIG. 6, the shards in datacenter 612 form a vertical bundle. In this example, the other data shards 622 in the vertical bundle and/or the horizontal derived shards 624 in the vertical bundle are not affected by the changes to the data shard 604 but the vertical derived shards 608 may need to be updated as a result of the changes to the data shard 604. Finally, as a result of the change to the horizontal derived shard 606, one or more vertical derived shards 610 related to the horizontal derived shard 606 in the vertical bundle in datacenter 616 may also be updated so that the vertical derived shards 610 may be used to reconstruct the horizontal derived shard 606 in the event of a loss of the horizontal derived shard 606 and the data shard 604.

Figure 7:
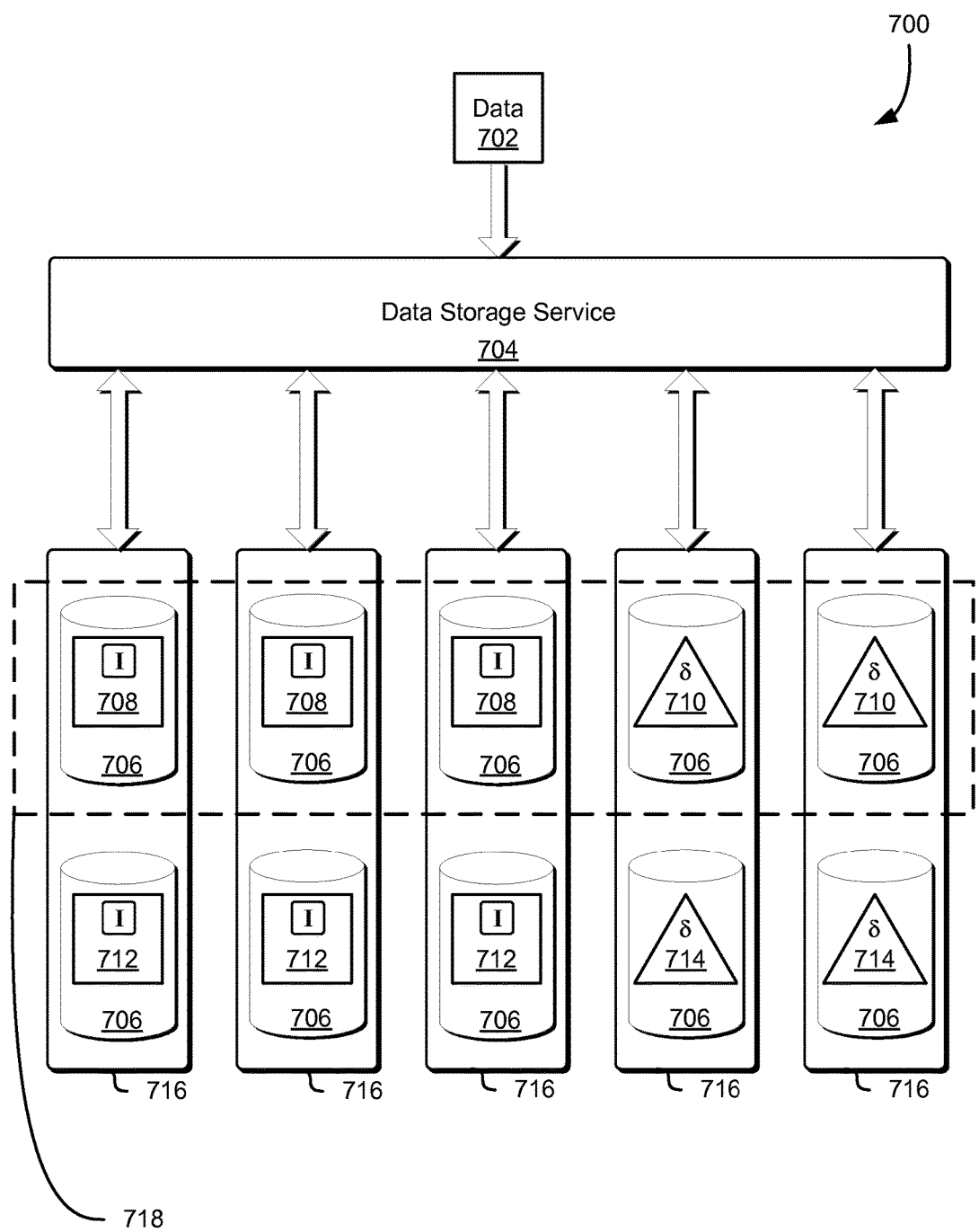
FIG. 7 illustrates an example environment where a redundancy encoding technique is applied to data stored in durable storage in accordance with at least one embodiment.

FIG. 7 illustrates an example environment 700 where a redundancy encoding technique is applied to data stored in durable storage as described herein and in accordance with at least one embodiment. The redundancy encoding technique illustrated in FIG. 7 is an example of a bundle encoding technique wherein one or more identity shards (also referred to herein as "data shards") may be bundled with one or more derived shards in a single group or dimension. Additional details of bundle encoding techniques are described in U.S. patent application Ser. No. 14/741,409, filed Jun. 16, 2015, entitled "ADAPTIVE DATA LOSS MITIGATION FOR REDUNDANCY CODING SYSTEMS," which is incorporated by reference herein.

Data 702 from preliminary storage may be sent to a data storage system 704 for redundant storage. The data 702 may be provided from the preliminary storage by any entity capable of transacting data with a data storage system, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 704 via application programming interface calls, web service calls, or other programmatic methods), and the like.

The data storage system 704 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 704 via application programming interface calls, web service calls, or other programmatic methods), and the like. In some embodiments, the resources of the data storage system 704, as well as the data storage system 704 itself, may be one or more resources of a computing resource service provider, such as that described in further detail below. In some embodiments, the data storage system 704 and/or the computing resource service provider provides one or more archival storage services and/or data storage services, such as those described herein, through which a client entity may provide data such as the data 702 for storage in preliminary storage and/or the data storage system 704.

Data 702 may include any quantity of data in any format. For example, the data 702 may be a single file or may include several files. The data 702 may also be encrypted by, for example, a component of the data storage system 704 after the receipt of the data 702 in response to a request made by a customer of the data storage system 704 and/or by a customer of computing resource service provider.

The data storage system 704 may sort one or more identity shards according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload and/or receipt (by the data storage system 704), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, for example, to optimize storage in embodiments where the overhead of retrieving data from multiple volumes is greater than the benefit of parallelizing the retrieval from the multiple volumes. Information regarding the sort order may be persisted, for example, by the data storage system 704, for use in techniques described in further detail herein.

As previously discussed, in some embodiments, one or more indices may be generated in connection with, for example, the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of the identity shard to be stored via the data storage system 704. For example, a data storage system 704 may generate a dense index for archives over a specified size (as the size of the index itself may be small relative to the number of archives stored on a given volume), and may also generate a sparse index for archives under that specified size (as the ratio of index size to archive size increases).

The data storage system 704 is connected to or includes one or more volumes 706 on which archives or identity shards may be stored. The generated indices for the archives may also be stored on the one or more volumes 706. The volumes 706 may be any container, whether logical or physical, capable of storing or addressing data stored therein. In some embodiments, the volumes 706 may map on a one-to-one basis with the data storage devices on which they reside (and, in some embodiments, may actually be the data storage devices themselves). In some embodiments, the size and/or quantity of the volumes 706 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume of the plurality of volumes 706, and in such embodiments, may reflect the archives stored on the respective volume to which it applies. In embodiments where sparse indices are used, a sparse index for a given volume may point to a subset of archives stored or to be stored on that volume, such as those archives which may be determined to be stored on the volume based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume. As may be contemplated, the indices (whether sparse or otherwise), may be determined prior to actually storing the archives on the respective volumes. In some embodiments, a space may be reserved on the volumes so as to generate and/or write the appropriate indices after the archives have been written to the volumes 706.

In some embodiments, the sparse indices are used in connection with information relating to the sort order of the archives so as to locate archives without necessitating the use of dense indices, for example, those that account for every archive on a given volume. Such sort order-related information may reside on the volumes 706 or, in some embodiments, on an entity separate from the volumes 706, such as in a data store or other resource of a computing resource service provider. Similarly, the indices may be stored on the same volumes 706 to which they apply, or, in some embodiments, separately from such volumes 706.

The archives may be stored, bit for bit (e.g., the "original data" of the archives), on a subset of the plurality of volumes 706. Also as mentioned, appropriate indices may also be stored on the applicable subset of the plurality of volumes 706. The original data of the archives is stored as a plurality of shards across a plurality of volumes, the quantity of which (either shards or volumes, which in some cases may have a one to one relationship) may be predetermined according to various factors, including the number of total shards that may be used to reconstruct the original data using a redundancy encode. In some embodiments, the number of volumes used to store the original data of the archives is the quantity of shards that may be used to reconstruct the original data from a plurality of shards generated by a redundancy code from the original data. As an example, FIG. 7 illustrates five volumes, three of which contain original data archives 708 and two of which contain derived data 710, such as redundancy encoded data. In the illustrated example, the redundancy code used may require any three shards to regenerate original data, and therefore, a quantity of three volumes may be used to write the original data (even prior to any application of the redundancy code).

The volumes 706 bearing the original data archives 708 may each contain or be considered as shards unto themselves. For example, the data 702 from preliminary storage may be copied directly only to a volume if, as described herein, it is stored in preliminary storage as an identity shard. In embodiments where the sort order-related information and/or the indices are stored on the applicable volumes 706, they may be included with the original data of the archives and stored therewith as shards, as previously mentioned. In the illustrated example, the original data archives 708 are stored as three shards (which may include the respective indices) on three associated volumes 706. In some embodiments, the original data archives 708 (and, in embodiments where the indices are stored on the volumes, the indices) are processed by an entity associated with, for example, the archival storage service, using a redundancy code, such as an erasure code, so as to generate the remaining shards, which contain encoded information rather than the original data of the original data archives. The original data archives 708 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes) or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, it may be therefore contemplated that the volumes bearing the original data (and the indices) may correspond to objects encoded from that original data by the identity matrix rows of the generator matrix of the applied redundancy code, while volumes bearing derived data correspond to other rows of the generator matrix. In the example illustrated in FIG. 7, the five volumes 706 include three volumes that have shards (e.g., identity shards) corresponding to the original data of the original data archives 708, while two have encoded shards corresponding to the derived data 710 (also referred to herein as "derived shards"). As illustrated in FIG. 7, the three original data archives 708, and the two encoded shards corresponding to the derived data 710 form a bundle 718 (denoted by the dashed line). In this example, the applied redundancy code may result in the data being stored in a "3:5" scheme, wherein any three shards of the five stored shards are required to regenerate the original data, regardless of whether the selected three shards contain the original data or the derived data.

In some embodiments, if one of the volumes 706 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, for example, the data storage system 704, by using a quantity of the remaining shards that may be used to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, for example, a generator matrix associated with the redundancy code, so as to differ in content from the unavailable shard (such as may be the case if the unavailable shard was a shard generated from the redundancy code, and therefore contains no original data of the archives). As discussed throughout this disclosure, the shards and/or volumes may be grouped and/or layered.

In some embodiments, retrieval of an archive stored in accordance with the techniques described herein may be requested by a client entity under control of a customer of the computing resource service provider and/or the archival storage service provided therefrom, as described in further detail throughout this disclosure. In response to the request, the data storage system 704 may locate, based on information regarding the sort order of the archives as stored on the volumes 706, the specific volume on which the archive is located. Thereafter, the index or indices may be used to locate the specific archive, whereupon it may be read from the volume and provided to a requesting client entity. In embodiments where sparse indices are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 704 may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the data storage system 704 may first determine the size of the requested archive, and if the requested archive is larger than or equal to the aforementioned size boundary, the dense index may be used so as to more quickly obtain the precise location of the requested archive.

In some embodiments, the volumes 706 may be grouped such that each given volume has one or more cohorts 716. In such embodiments, a volume set (e.g., all of the illustrated volumes 706) may be implemented such that incoming archives to be stored on the volumes are apportioned to one or more failure-decorrelated subsets of the volume set. The failure-decorrelated subsets may be some combination of the volumes 706 of the volume subset, where the quantity of volumes correlates to a number of shards required for the implemented redundancy code. In the illustrated example, the overall volume set may comprise two failure-decorrelated subsets (volumes in a horizontal row) where a given constituent volume is paired with a cohort (e.g., the cohort 716). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., original data archives 708 and/or original data archives 712), while others store derived data (e.g., derived data 710 and derived data 714). The data storage system 704 may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset as shown by original data archives 708 and derived data 710, while others are apportioned to volumes in a different pattern as shown by original data archives 712 and derived data 714. The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 8:
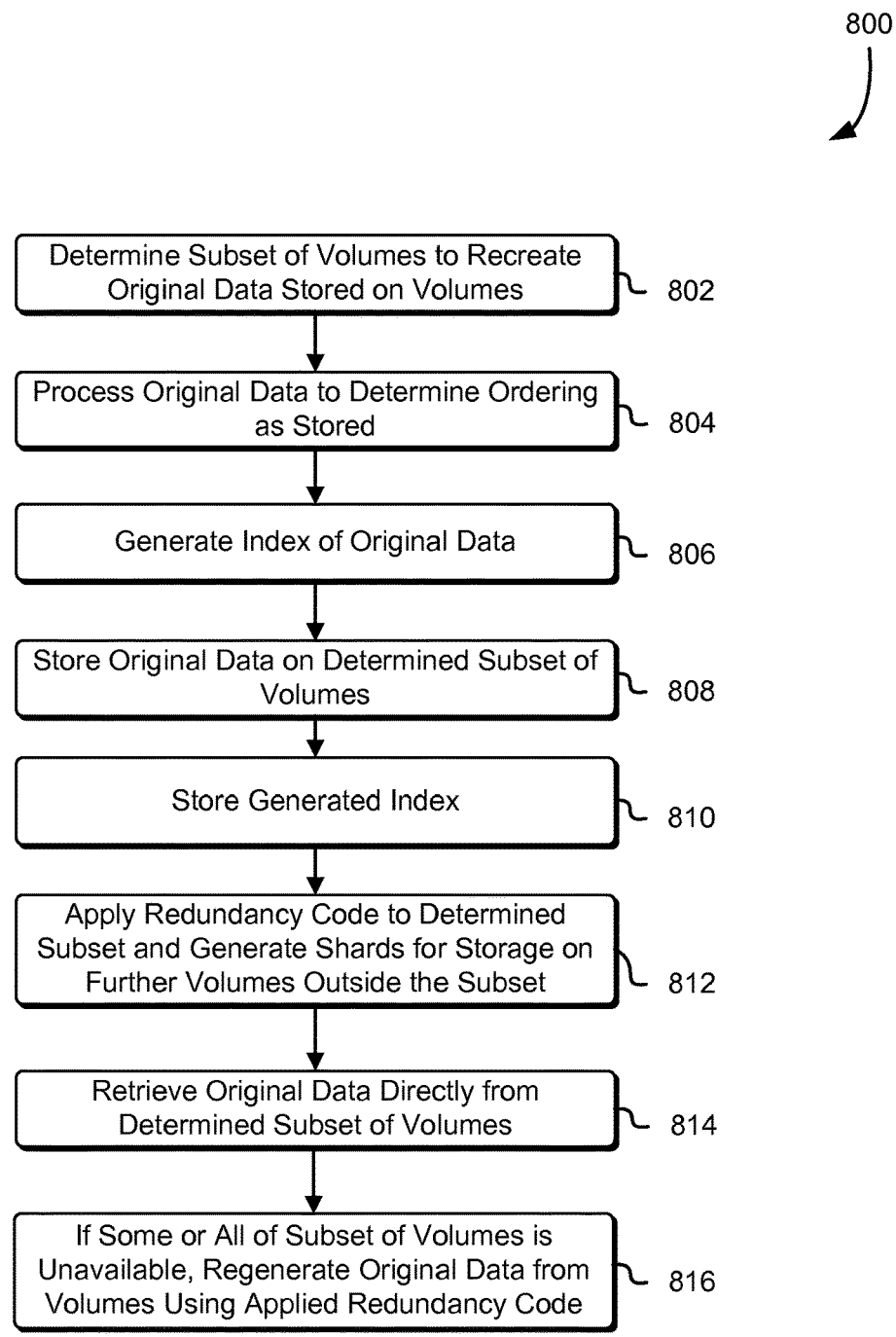
FIG. 8 illustrates an example process for applying redundancy encoding techniques to data stored in durable storage in accordance with at least one embodiment.

FIG. 8 illustrates an example process 800 for applying redundancy encoding techniques to data stored in durable storage as described herein in connection with FIG. 1 and in accordance with at least one embodiment. The example process 800 illustrated in FIG. 8 illustrates the processing, indexing, storing, and retrieving of data stored on a data storage system. The data may be retrieved from preliminary storage as described herein. The example process 800 illustrated in FIG. 8 may be used in conjunction with a grid encoding technique such that described in connection with FIG. 6, in conjunction with a bundle encoding technique such as that described in connection with FIG. 7, or with some other redundancy encoding technique. A data storage service such as the data storage service described herein may perform the example process 800 illustrated in FIG. 8.

At step 802, a resource of a data storage system, such as that implementing a redundancy code to store archives, determines which subset (e.g., quantity) of a plurality of volumes that may be used to recreate the original data to be stored, based on, for example, a redundancy code to be applied to the archives. For example, in accordance with the techniques described above in connection with FIG. 7, such information may be derived from predetermining the parameters of an erasure code with a specified ratio of shards that may be used to regenerate the original data from which they derive to the total number of shards generated from the application of the erasure code.

At step 804, original data, such as original data of archives received from customers of, for example, a data storage system or a computing resource service provider as described in further detail herein, is sorted by, for example, the data storage system or associated entity. For example, the sort order may be implemented on one or more attributes of the incoming data.

At step 806, one or more indices, such as sparse indices, are generated by, for example, the data storage system, for the original data. For example, there may be more than one index for a given volume, and such parallel indices may be of different types depending on the nature of the archives and/or original data being stored.

At step 808, the original data is stored, for example, by the data storage system, on the subset of volumes determined in connection with step 802, and in the order determined in step 804. Additionally, at step 810, the index generated in step 806 is stored, for example, by the data storage system, on an appropriate entity. For example, the index may be stored as part of a shard on which the original data is stored, or, in some embodiments, may be stored on a separate resource from that which persists the volume.

At step 812, the redundancy code is applied, for example, by the data storage system, to the determined subset of volumes (e.g., shards, as previously described herein), and additional shards containing data derived from the application of the redundancy code are stored on a predetermined quantity of volumes outside the subset determined in connection with step 802. For example, the ratio of volumes (e.g., shards as previously described herein) storing the original data to the overall quantity of volumes (including those storing the derived data generated in this step 812) may be prescribed by the recovery/encoding ratio of the redundancy code applied herein.

At step 814, in normal operation, requested data may be retrieved, for example, by the data storage system, directly from the subset of volumes storing the original data, without necessitating retrieval and further processing (e.g., by the redundancy code) from the volumes storing the derived data generated in step 812. However, at step 816, if any of the volumes are determined, for example, by the data storage system, to be unavailable, a replacement shard may be generated by the data storage system by reconstructing the original data from a quorum of the remaining shards, and re-encoding using the redundancy code to generate the replacement shard. The replacement shard may be the same or may be different from the shard detected as unavailable.

Figure 9:
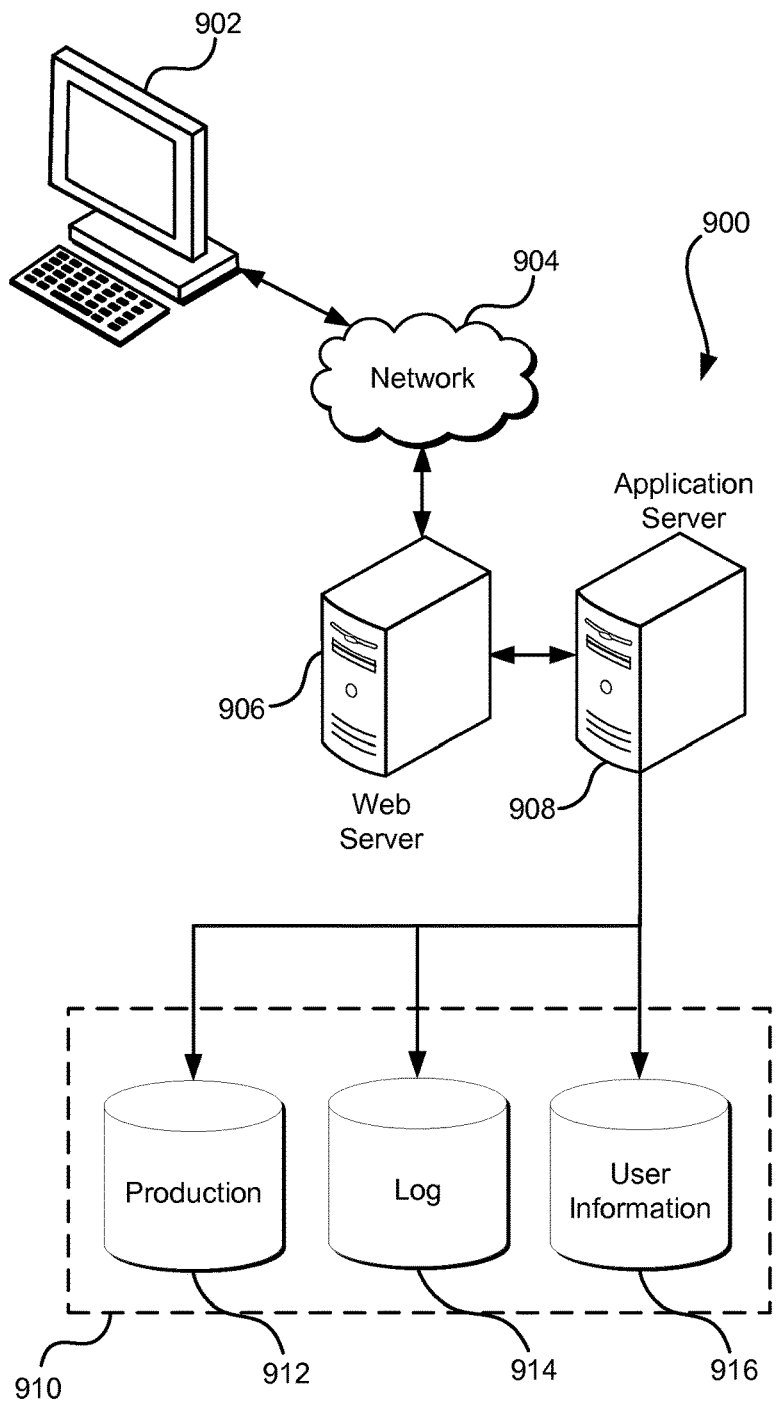
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto.

The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
in response to receiving a plurality of data storage requests for data to be stored in a plurality of volumes of durable storage of a data storage system, processing the data storage requests by at least:
obtaining events associated with each of the plurality of data storage requests;
assigning the events to one or more specified database tables, wherein the one or more database tables are rotated for assignment of the events, the database tables being configured so as to include an entry for each of the assigned events in both:
a primary index table that utilizes a pseudorandomly generated primary key for each of the assigned events; and
a secondary index table that uses information in the primary index table as its primary key, the information being different from the pseudorandomly generated primary key;
storing, asynchronous from receiving the plurality of the data storage requests, the data into the plurality of volumes in accordance with the events assigned to the one or more database tables, the data stored by at least:
applying a redundancy code to the data associated with the data storage requests to generate a set of shards representative of the data;
storing the shards on the plurality of volumes; and
updating entries corresponding to the events assigned to the one or more database tables; and
responding, synchronous from receiving the plurality of the data storage requests, to status requests regarding pendency of the events associated with each of the plurality of data storage requests by at least using the primary key of the secondary index table.

2. The computer-implemented method of claim 1, wherein each primary key includes information that identifies the respective assigned event.

3. The computer-implemented method of claim 1, further comprising updating the secondary index table in connection with populating the primary index table with each of the entries for the assigned events.

4. A system, comprising:
at least one computing device configured to implement one or more services, wherein the one or more services are configured to:
in response to receiving a plurality of data processing requests, process the plurality of requests by at least:
assigning events associated with each request of the plurality of requests to a subset of a series of database tables, wherein the subset of the series of database tables is cycled for assignment of the events, each of the assigned events being associated with a respective identifier, the identifier generated stochastically, and the assigning of events causing each event of the assigned event to be allocated to a processing partition based on a value of the respective identifier; and
in response to an update related to an allocated event, using a respective processing partition to execute the update.

5. The system of claim 4, wherein the one or more services are further configured to asynchronously service the allocated events.

6. The system of claim 5, wherein the asynchronous servicing of the allocated events cause the related update.

7. The system of claim 4, wherein the plurality of data processing requests are data storage requests.

8. The system of claim 7, wherein the one or more services are further configured to, in response to the data storage requests, asynchronously service the data storage requests by at least:
encoding data associated with the data storage requests using a redundancy code, so as to generate a set of shards, a quorum quantity of the set usable to reconstruct original data associated with the set of shards;
storing the shards on one or more data storage devices; and
generating updates for a respective allocated event in accordance with storing the shards.

9. The system of claim 4, wherein the database tables include both a primary index table and a secondary minimal index table that is keyed to an attribute, other than an identifier to which the primary index table is keyed.

10. The system of claim 9, wherein the one or more services are further configured to synchronously respond to status requests related to the allocated events using at least information in the secondary minimal index table.

11. The system of claim 10, wherein the processing partition is administered by a database service capable of manipulating the processing partition.

12. A non-transitory computer-readable storage medium storing thereon executable instructions that, when executed by one or more processors of a computer system, cause the computer system to at least:
in response to receiving a data processing request, populate a database table with information relating to a plurality of events associated with the data processing request, the information including an identifier for each event of the plurality of events, the database table being configured to use the identifier as its primary key, the identifier being generated so as to decorrelate the events from other events when the events are assigned;
assign each event of the plurality of events to one of a plurality of processing partitions based at least in part on a value of the identifier, each processing partition of the plurality of processing partitions having a portion of overall processing capacity of a database service configured to service the plurality of events; and
cause the database service to service the event using the processing partition.

13. The non-transitory computer-readable storage medium of claim 12, wherein the instructions further comprise instructions that, as a result of being executed by the one or more processors, cause the computer system to populate a a different database table the information relating to the plurality of events after an interval of time, thereby causing unprocessed events of the plurality of events to be assigned to another of a plurality of processing partitions.

14. The non-transitory computer-readable storage medium of claim 12, wherein the instructions further comprise instructions that, as a result of being executed by the one or more processors, cause the computer system to asynchronously process the events on the database table so as to service the data processing request.

15. The non-transitory computer-readable storage medium of claim 12, wherein the instructions further comprise instructions that, as a result of being executed by the one or more processors, cause the computer system to generate, in response to population of the database table, a secondary minimal index table that uses information in the database table other than the identifier as a primary key.

16. The non-transitory computer-readable storage medium of claim 15, wherein the instructions further comprise instructions that, as a result of being executed by the one or more processors, cause the computer system to process status inquiries related to an event of the plurality of events by performing a lookup using at least the secondary minimal index table.

17. The non-transitory computer-readable storage medium of claim 12, wherein the data processing requests are associated with data to be stored in accordance with the requests, on one or more data storage devices associated with the system.

18. The non-transitory computer-readable storage medium of claim 17, wherein the instructions further comprise instructions that, as a result of being executed by the one or more processors, cause the computer system to asynchronously cause the storage of the data on the one or more data storage devices.

19. The non-transitory computer-readable storage medium of claim 18, wherein the asynchronous storage of the data generates at least some of the plurality of events.

* * * * *